Figure 1:
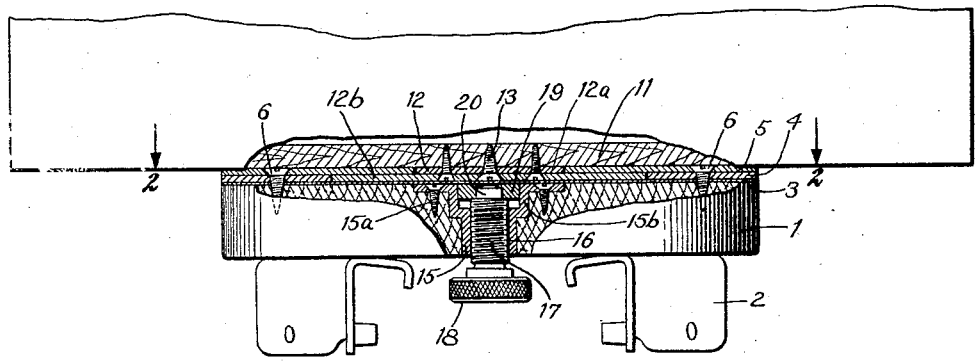

May 24, 1927.

H. O. LANGLEY

CAMERA SUPPORTING MEANS

Filed Nov. 21, 1925

1,629,579

Inventor
Herman O. Langley,
By his Attorneys,
Ward, Crosby and Smith

Patented May 24, 1927.

1,629,579

UNITED STATES PATENT OFFICE.

HERMAN OSBORN LANGLEY, OF ST. ALBANS GARDENS, NEW YORK.

CAMERA-SUPPORTING MEANS.

Application filed November 21, 1925. Serial No. 70,540.

The invention relates to camera supporting means and particularly to improved devices by which cameras or similar instruments may be mounted upon and secured to a tripod or stand.

In common practice when a camera is to be mounted upon a tripod, it is simply positioned thereon and secured in position by means of the central screw with which the tripod is provided. This operation is often unsatisfactory because of the fact that it is difficult to quickly bring the screw into connection with its co-acting threaded socket and because the camera will not be securely held in position on the tripod while making angular adjustment of the camera and before the screw has been tightened.

An object of the invention is the provision of simple and effective means whereby the camera may be mounted quickly and easily in a supported position upon the tripod or stand, in which position it may be rotated to any desired angular extent relative to the tripod and in which position it may be firmly secured.

This is accomplished by providing one of the two co-acting elements, such as the tripod head or stand, with an undercut guide-way terminating in a semi-circular portion. The other co-acting member, such as the camera, is provided with a circular stepped plate adapted to be inserted in this guide-way and slid laterally into position in which the stepped plate rotatably engages with the semi-circular end portion of the guide-way, the stepped plate having a portion of larger diameter which slidably engages beneath the overhanging portion of the guide-way.

When the parts are thus mounted in co-acting relation, the camera may be freely rotated into any desired angular position without the necessity of operating any levers or screws or other auxiliary parts. When the camera is thus adjusted into its desired angular position, it may be firmly and fixedly secured in such position by means of a suitable device for clamping the parts together. This clamping device may be the usual screw with which all tripods are provided, or a similar screw extending upwardly through an axial opening in the head of the tripod, which is adapted to bind the co-acting parts, namely the circular stepped plate and the guide-way in which the same is slidably mounted, firmly together. In the preferred form of construction the necessity of having aligned openings in the parts attached to the camera and the tripod, through which the clamping screw may be passed, is done away with, the upper end of the clamping screw, or an abutment engaged thereby bearing against the stepped disc to press the same firmly against the overhanging portion of the guide-way in which it is seated. An extremely simple and readily adjusted device is thereby provided since it is merely necessary to position the camera in desired angular relation upon the tripod head and then tighten the clamping screw with a small movement to bind the parts firmly together.

The invention consists in the combinations of parts and details of construction employed in and comprising such a device as will be more fully set forth in the following specification and be particularly pointed out in the appended claims.

In order that the invention may be more clearly understood attention is hereby called to the accompanying drawings forming part of this application and illustrating one embodiment of the invention.

Figure 2:
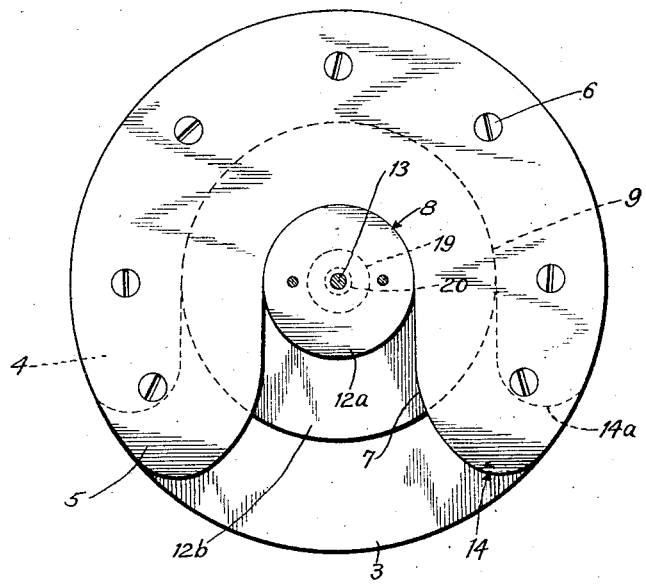

In the drawings Fig. 1 is a central vertical section through a camera mounted upon a tripod head, parts being shown in side elevation and other parts being broken away; and Fig. 2 is a horizontal section taken on the line 2—2 of Fig. 1.

Referring to the drawings the tripod head 1 of the usual cylindrical form is shown as provided with the usual brackets 2 by which the tripod legs may be secured thereto. A metal face plate 3 is shown as mounted upon the head 1, upon which is mounted a plate 4 with a plate 5 extending thereover, plates 3, 4 and 5 being secured immovably to tripod head 1 by suitable means such as the screws 6. Plate 3 is preferably formed of comparatively thin metal so as to have a certain amount of resiliency for a purpose hereinafter described.

Plates 3, 4 and 5 preferably have circular outer peripheries in alignment with the outer circular edge of the stand 1. Plate 5 is provided with a slot 7 extending from one edge of the same and terminating in a semi-circular portion 8 concentric with tripod head 1 and plates 3, 4 and 5. Plate 4 is cut away in a similar manner so that its inner edge as indicated at 9 will be parallel to the guide-way 7 of plate 5 but with a larger radius of curvature. Plates 5 and 4, therefore, provide what may be termed an undercut guide-way terminating in a semi-circular seating portion.

One of the two elements to be secured together, such as the tripod head, being provided with the guide-way described, the other co-acting member, such as the camera, is provided with means adapted to be inserted into the guide-way. This means is shown in the drawings as secured to the bottom of the camera 10. As is shown in the drawings the bottom plate 11 of the camera may have a cylindrical stepped plate 12 secured axially thereto by suitable means such as the screw 13. The stepped plate referred to by reference character 12 may, of course, be formed as an integral construction or as two plates of different diameter, one secured upon the other, an integral construction being shown in the drawings. As there shown the stepped plate comprises a portion $12^a$ of one diameter, adjacent to the bottom plate 11 of the camera, and a portion $12^b$ of larger diameter, further away from the plate 11 of the camera.

When the camera is to be mounted upon the tripod the stepped disc 12 will be inserted through the open end of the guide-way 7, 9. The outer end of this guide-way preferably flares or curves outwardly as is indicated at 14, $14^a$, so that the stepped disc 12 may be inserted therein very quickly and easily. When the stepped disc has been pushed into its final position in the guide-way the portion $12^b$ of the disc of larger diameter will extend under the overhanging semi-circular portion of the guide-way 7 with the portion $12^a$ of the stepped disc rotatably engaging within the semi-circular portion of guide-way 7, both portions $12^a$ and $12^b$ of the stepped disc preferably rotatably engaging against the semi-circular inner walls of plates 5 and 4. The parts preferably are designed to have a fairly close fit so that the stepped disc will fit snugly in operative position but so that the camera may readily be rotated into any desired angular position.

The camera may be very readily and quickly secured firmly in an adjusted position by a suitable clamping device which preferably takes the form of a screw extending axially upwards through the head of the tripod, similar to the clamping screws with which all the usual makes of tripod heads are provided. As shown the tripod head 1 may be provided with an axial opening within which is firmly mounted a bushing 15, which may be secured in position in any desired manner as by the screws $15^a$ which are shown as extending through a flange formed on the bushing into the tripod head 1. The bushing is preferably internally threaded as is indicated at 16. A screw 17 is mounted within the bushing 15 and may be provided at its lower end with a knurled head 18. Turning this screw in the proper direction to move it upwardly causes pressure to be transmitted by the upper end of the screw, to press the lower, larger portion, $12^b$, of the stepped disc 12, upwardly against the overhanging portion of the guide-way therefor formed by plate 5.

Preferably this pressure is transmitted by means of the plate 3 which as shown is fastened to the upper surface of the tripod head 1. In the preferred construction this plate 3 extends uninterruptedly above the upper end of the screw 17 and the pressure exerted by screw 17 to plate 3 is transmitted thereby to the stepped disc and serves to force the same upwardly against plate 5 as stated, plate 3 being somewhat resilient.

Preferably the upper end of the screw is provided with a head or enlargement so that the pressure of the screw will be applied to a larger area of the plate 3 than would be the case if the end of the screw itself were permitted to bear directly against a point on plate 3. In the preferred form of construction bushing 15 is provided at its upper end with a portion $15^b$ of enlarged diameter within which is mounted a disc 19 which is shown as surrounding an upper end portion 20 of screw 17, the same being of reduced diameter. It will be evident that the upward pressure of screw 17 is applied to sheet 3 by means of the disc or head 19. Disc 19 may be pinned or otherwise secured to portion 20 of the screw if desired, in which case it will constitute a positive means to prevent the screw from being entirely unscrewed from its opening in bushing 15 and possibly lost; or if desired the disc 19 may be loosely mounted upon the reduced portion 20 of the screw, in which case reliance is placed upon the somewhat extended threaded bearing for the screw in bushing 15, to prevent the screw from being entirely unscrewed and possibly lost.

It will be noted that the device provides an extremely quick, simple and effective means for securing the camera in position on the tripod head in any desired position and for removing the same therefrom. When the camera is to be placed in position, the converging outer portions of the guide-way make it an easy matter to slide the stepped plate into position. The semi-circular portion of the guide-way is preferably of the same radius of curvature as the stepped plate, preferably both portions $12^a$ and $12^b$ of the stepped plate having rotative engagement with the corresponding semi-circular portions of the guide-way so that a substantial rotative bearing is provided. When the stepped plate is thus seated in position angular adjustment of the camera can be made very quickly and accurately by simply turning the camera into the desired position while holding the same firmly pressed against the semi-circular guide-way portion, after which a partial turn of the screw will suffice to bind the parts firmly into exact required position.

It should be understood that the invention is not limited strictly to the exact details of construction which have been broadly described, the scope of the invention being indicated by the appended claims.

What I claim as new and desire to secure by Letters Patent is:

1. In instrument supporting means, the combination of an instrument and a base member upon which the same is adapted to be detachably supported, said base member having an undercut guide-way extending laterally thereof and terminating in a semi-circular portion, and said instrument having a circular stepped plate fixed thereto, adapted to be inserted in said guideway with the larger diameter thereof beneath the overhanging portion of said guideway, said plate being adapted to rotatably fit in said semi-circular guideway portion, said base member having an upwardly extending opening therethrough, and clamping means manually operable in said opening, to press upwardly against said stepped plate to bind the same firmly against the overhanging portion of said guideway.

2. In instrument supporting means, the combination of an instrument and a base member upon which the same is adapted to be detachably supported, said base member having an undercut guideway extending laterally thereof and terminating in a semi-circular portion, and said instrument having a circular stepped plate fixed thereto, adapted to be inserted in said guideway with the larger diameter thereof beneath the overhanging portion of said guideway, said plate being adapted to rotatably fit in said semi-circular guideway portion, said base member having a screw-threaded opening extending upwardly therethrough, and a clamping screw threaded in said opening, adapted to transmit pressure upwardly against said stepped plate to bind the same firmly against the overhanging portion of said guideway.

3. In instrument supporting means, the combination of an instrument and a base member upon which the same is adapted to be detachably supported, a bearing plate secured on said base member, undercut guideway means secured on said bearing plate, comprising an under portion and an overhanging portion formed to provide a laterally extending guideway terminating in a semi-circular portion, a stepped plate fixed to said instrument, adapted to be inserted in said guideway with the larger portion thereof beneath the overhanging portion of the guideway, said base member having an upwardly extending opening therethrough terminating at the lower surface of said bearing plate, and clamping means operable in said opening to press upwardly against said bearing plate and transmit pressure thereby to said stepped plate to clamp the latter against the overhanging portion of said guideway.

4. In instrument supporting means, the combination of an instrument and a base member upon which the same is adapted to be detachably supported, a bearing plate secured on said base member, undercut guideway means secured on said bearing plate, comprising an under portion and an overhanging portion formed to provide a laterally extending guideway terminating in a semi-circular portion, a stepped plate fixed to said instrument, adapted to be inserted in said guideway with the larger portion thereof beneath the overhanging portion of the guideway, said base member having an upwardly extending threaded opening therein, and a screw threaded in said opening adapted to exert pressure against said bearing plate and transmit pressure thereby to said stepped plate to clamp the latter against the overhanging portion of said guideway.

5. In instrument supporting means, the combination of an instrument and a base member upon which the same is adapted to be detachably supported, one of said elements having an immovable undercut guideway extending laterally thereof and terminating in a semi-circular portion, and the other of the same having a stepped plate fixed thereto adapted to be inserted in said guideway with the larger portion thereof beneath the overhanging portion of said guideway, said plate being adapted to rotatably fit in said semi-circular guideway portion, said base member having an upwardly extending opening therein, a bushing in said opening, the lower portion of the opening through the bushing being threaded and the upper part being enlarged, a screw threaded in said threaded opening portion and a member in said enlarged bushing opening engaged by said screw to transmit pressure therefrom to said plate and guideway to clamp the same together.

6. In instrument supporting means, the combination of an instrument and a base member upon which the same is adapted to be detachably supported, said elements having plates secured thereto, forming in the case of one element, an undercut guideway extending laterally of the element and terminating in an enlarged portion, and forming, in the case of the other element, a stepped plate adapted to be inserted in said guideway with the larger portion thereof beneath the overhanging portion of the guideway, said plate being rotatable in said enlarged guideway portion, said base member having an opening extending upwardly therein, and clamping means manually operable in said opening, adapted to exert pressure upwardly on one of said plates to bind said stepped plate firmly against its seat in said guideway.

In testimony whereof I have signed my name to this specification.

HERMAN O. LANGLEY.